Figure 1:
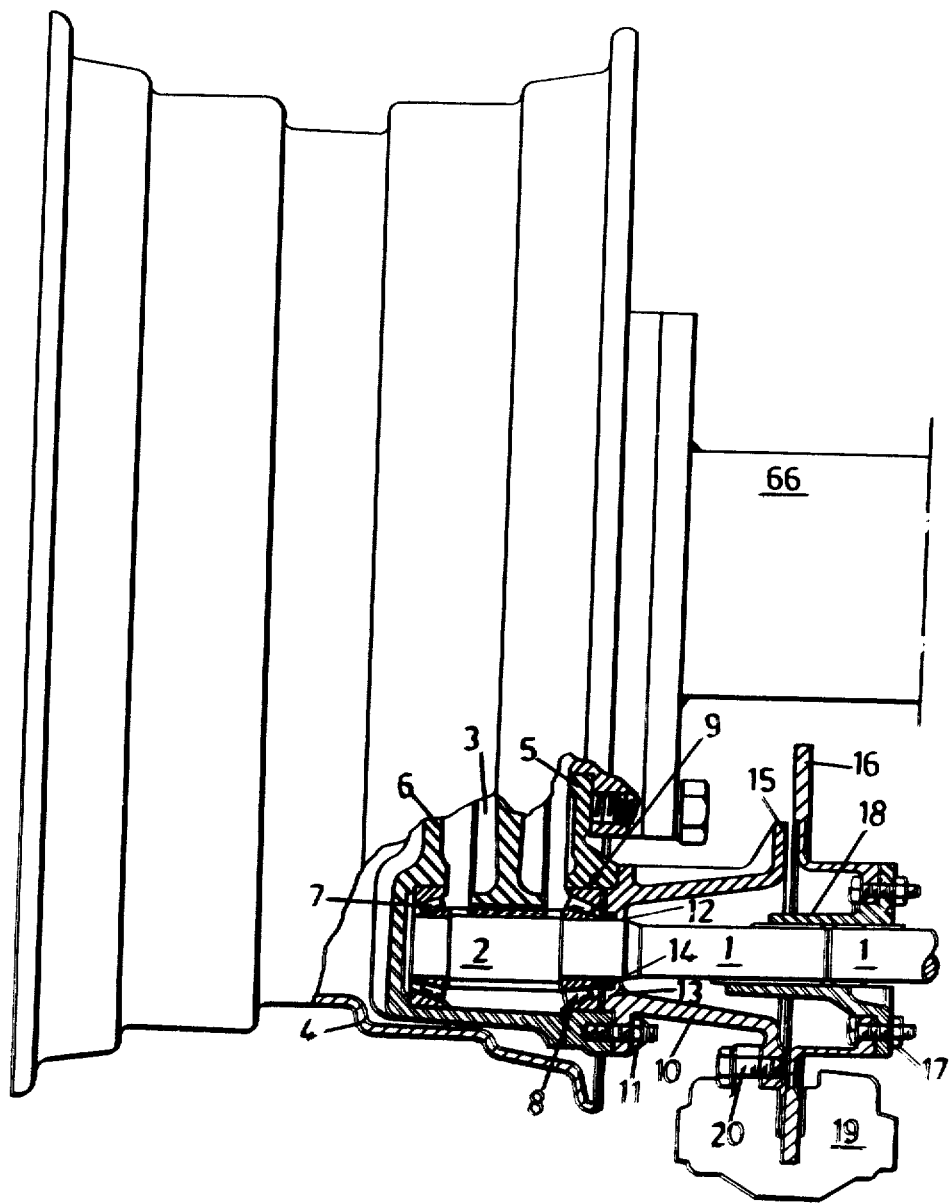

United States Patent [19]

Bruni

[11] 3,892,285

[45] July 1, 1975

[54] DUST PROTECTION DEVICE FOR REDUCTION UNITS AT THE DRIVE WHEELS OF LARGE AGRICULTURAL MACHINES

[75] Inventor: Mario Bruni, Sesto S. Giovanni, Milano, Italy

[73] Assignee: White Farm Equipment Company, Wilmington, Del.

[22] Filed: May 7, 1974

[21] Appl. No.: 467,826

[30] Foreign Application Priority Data

May 18, 1973 Italy................................ 46850/73

[52] U.S. Cl. .............. 180/75; 188/71.1; 188/18 A; 188/218 A
[51] Int. Cl............................................. B60t 17/00
[58] Field of Search ......... 180/70 R, 75, 84, 85, 88, 180/6.2, 6.7, 1 F; 188/18 A, 71.1, 218 A, 18 A

[56] References Cited
UNITED STATES PATENTS

| 1,302,151 | 4/1919 | Goff..................................... 180/88 |
| 1,868,474 | 7/1932 | Strehlow.......................... 180/6.2 X |
| 2,961,057 | 11/1960 | Johnson............................. 180/6.2 |
| 3,142,364 | 7/1964 | Mikkelson ................. 188/218 A X |
| 3,161,249 | 12/1964 | Bouladon et al............ 188/218 A X |

*Primary Examiner*—Kenneth H. Betts
*Attorney, Agent, or Firm*—Brisebois & Kruger

[57] ABSTRACT

Protection device for reduction units at the drive wheels of large agricultural machines comprises a fixed hollow bell shaped body extending from the inlet opening for the drive shaft in the reduction unit, which terminates in a flat circular rim parallel and very close to the friction disc.

1 Claim, 1 Drawing Figure

DUST PROTECTION DEVICE FOR REDUCTION UNITS AT THE DRIVE WHEELS OF LARGE AGRICULTURAL MACHINES

SUMMARY OF THE INVENTION

The transmission of motion to the wheels of certain large agricultural power machines, such as combine harvesters, is notably obtained by the engagement between a pinion gear mounted at the end of each drive shaft, and a gear wheel of large diameter rigid with the wheel rim.

This engagement is eccentric with respect to the axis of rotation of the wheel, which is idly mounted by way of suitable rolling bearings on a stub axle rigid with the machine chassis.

The reasons which justify interposing this large reduction in the transmission between the differential and the wheel are many, and derive mainly from the need to limit the dimensions of the differential unit with respect to the transmitted power.

This technique also simplifies the braking system, which can be obtained by disposing a simple disc or drum brake on the drive shaft of each wheel.

For obvious reasons of lubrication, the transmission gear pair is contained in an oil-tight housing, and one of the greatest problems in designing these reduction units at the wheel consists of making suitable arrangements for preventing any possible entry of dust of any kind into the housing.

Experience has shown that one of the points at which dust is most likely to enter said housing is the point in which the drive shaft enters the housing, and all the devices usually used up to the present time, such as oil seals and the like, have proved to be extremely deficient because of the extraordinary environmental conditions in which the machine has to operate.

The object of the present invention is to provide a dust protection device where the drive shaft enters the housing.

In accordance with the invention said device is formed from the combination of a suitable bell mouth rigid with the housing and the friction disc of the braking device.

To attain this object, the invention provides, on the outside of the housing around the drive shaft inlet hole, a bell surface terminating in a flat flange with a circular rim orthogonal and coaxial to the drive shaft.

Moreover according to the invention, the brake disc rigid with the drive shaft is mounted in such a manner that its flat surface rotates facing the flange of said fixed bell, at a very small distance from it.

In this manner the fixed bell also supports the shoes of the brake caliper.

The inner volume of the bell is defined at one end by a fixed surface which contains the inlet aperture for the drive shaft into the housing, and at the opposite end by the rotating surface of the brake disc.

The rotation of this brake disc tends to entrain the air and the particles close to it, and consequently inside the bell a rotary motion of the air tends to be set up with centrifugal tendencies outwards.

This motion prevents entry of the dust particles into the bell because if they should begin to enter the gap between the bell and disc they would be immediately repelled by the centrifugal force which acts on them.

The technical, operation and constructional merits and characteristics of the invention will be further clarified by the detailed description given hereinafter with reference to the accompanying drawing, which illustrates a possible preferred embodiment given by way of non-limiting example.

FIG. 1 is a partial section through the transmission and braking assembly constructed in accordance with the invention.

The FIGURE shows the drive shaft 1 which terminates with the pinion gear 2 which engages with the gear wheel 3 rigid with the rim 4 of the wheel of the agricultural machine concerned.

The reduction unit consisting of the pinion 2 and gear wheel 3 is contained in a housing formed from a base 5 and a cover 6 which are both rigid with the machine axle 66.

The end part of the drive shaft 1 is supported by two bearings 7 and 8, of which the bearing 7 is housed in an appropriate seat in the cover 6 and the bearing 8 is housed in a hole 9 in the base 5.

The hole 9 also receives the bell 10 which is fixed to the base 5 by a certain number of peripheral bolts 11.

This bell 10 comprises a hole 12 through which the drive shaft 1 passes, a shoulder 13 in which an elastic seal ring 14 is positioned, and a terminal flange 15 comprising an outer flat surface in the form of a circular rim.

The friction disc 16 of the braking unit rotates facing the flange 15, the braking unit being fixed by bolts 17 on the sleeve 18 which is rigid with the drive shaft 1.

The flange 15 supports the brake caliper unit 19 by means of the bolts 20.

It can be seen that the inner space of the bell 10 is occluded by the disc 16 which, when the vehicle is running, rotates at high speed and creates a centrifugal motion of the air present in the gap 21 between the flange 15 and disc 16.

This centrigugal motion, as stated, prevents entry of dust particles into the bell 10.

The invention is not limited to the single embodiment heretofore described, and modifications and improvements may be made to it without leaving the scope of the invention, the essential characteristics of which are summarised in the following claims.

What is claimed is:

1. Dust protection device for reduction units at the drive wheels of large agricultural machines, substantially of the type in which the wheel rim rotates idly on a stub axle rigid with the machine chassis and is rigid with a gear wheel of large diameter which engages with a small pinion gear present at the end of the drive shaft for said wheel, the reduction unit being contained in an oil tight housing having an inlet opening for the drive shaft, said device comprising in combination with the friction disc of a braking device which rotates rigidly with the drive shaft, a fixed hollow bell shaped body extending from said inlet opening and terminating in a flat circular rim parallel and very close to said friction disc, so that said disc, on rotating, induces a centrifugal vortex of air inside said bell.

* * * * *